US009852495B2

(12) United States Patent
Silver et al.

(10) Patent No.: US 9,852,495 B2
(45) Date of Patent: Dec. 26, 2017

(54) MORPHOLOGICAL AND GEOMETRIC EDGE FILTERS FOR EDGE ENHANCEMENT IN DEPTH IMAGES

(71) Applicant: INTEL CORPORATION, Santa Clara, CA (US)

(72) Inventors: David H. Silver, Haifa (IL); Michael Bronstein, Lugano (CH); Alex Bronstein, Haifa (IL); Ron Kimmel, Haifa (IL); Erez Sperling, D.N. Menashe (IL); Vitaly Surazhsky, Yokneam Illit (IL); Aviad Zabatani, Even Yehuda (IL); Ohad Manashe, Haifa (IL)

(73) Assignee: Intel Corporation, Santa Clara, CA (US)

( * ) Notice: Subject to any disclaimer, the term of this patent is extended or adjusted under 35 U.S.C. 154(b) by 43 days.

(21) Appl. No.: 14/978,429

(22) Filed: Dec. 22, 2015

(65) Prior Publication Data
US 2017/0178305 A1 Jun. 22, 2017

(51) Int. Cl.
G06T 5/00 (2006.01)
(52) U.S. Cl.
CPC .... G06T 5/002 (2013.01); *G06T 2207/20036* (2013.01); *G06T 2207/20192* (2013.01)
(58) Field of Classification Search
CPC . G06T 5/002; G06T 5/30; G06T 2207/10028; G06T 5/00; G06T 5/001; H04N 19/117
See application file for complete search history.

(56) References Cited

U.S. PATENT DOCUMENTS

2002/0181024 A1* 12/2002 Morimoto .......... H04N 1/40075
358/3.15
2007/0052845 A1 3/2007 Adams
(Continued)

OTHER PUBLICATIONS

Notification of Transmittal of the International Search Report and the Written Opinion of the International Searching uthority issued for International Patent Application No. PCT/US2016/056857, dated Jan. 23, 2017.

*Primary Examiner* — Andrew Moyer
(74) *Attorney, Agent, or Firm* — Alpine Technology Law Group LLC

(57) ABSTRACT

A mechanism is described for facilitating three-dimensional (3D) depth imaging systems, and morphological and geometric filters for edge enhancement in depth images at computing devices according to one embodiment. A method of embodiments, as described herein, includes detecting an input digital image of an object, the digital image comprising data pixels contaminated by noise and confidence values corresponding to the data pixels, and computing a morphological filter by matching the confidence pixels in the input digital image with a set of matching templates, and using a set of masking templates to determine the data pixels and confidence pixels in the filtered image. The method further include computing an edge filter by performing computation of distances between the data pixels along a plurality of directions to determine an edge direction, and determining the data pixels and and the confidence pixels in a filtered image based on the edge direction. The method may further include applying at least one of the morphological filter and the edge filter to filter the digital image.

14 Claims, 7 Drawing Sheets

(56) References Cited

U.S. PATENT DOCUMENTS

| | | | |
|---|---|---|---|
| 2007/0223044 A1* | 9/2007 | Bailey | G06K 15/02 358/3.06 |
| 2011/0187820 A1 | 8/2011 | Gilboa et al. | |
| 2011/0194762 A1* | 8/2011 | Haibing | G06K 9/00281 382/165 |
| 2011/0212717 A1* | 9/2011 | Rhoads | G06F 17/30241 455/420 |
| 2011/0274366 A1* | 11/2011 | Tardif | G06T 5/002 382/260 |
| 2012/0127270 A1 | 5/2012 | Zhang et al. | |
| 2012/0306904 A1 | 12/2012 | Francois et al. | |
| 2013/0250053 A1 | 9/2013 | Levy | |
| 2015/0146994 A1* | 5/2015 | Arnison | G06T 7/571 382/254 |

\* cited by examiner

FIG. 7

METHOD 700

```
DETECTION OF A DIGITAL IMAGE, WHERE THE DIGITAL IMAGE IS
CAPTURE USING ONE OR MORE CAPTURING/SENSING COMPONENTS,
SUCH AS ONE OR MORE DEPTH-SENSING CAMERAS, AND INCLUDES
CONTAMINATED PIXELS CAUSING DEPTH EDGE NOISE, SUCH AS
LACK OF OR REDUCED SHARPNESS IN THE DIGITAL IMAGE
```
~701

↓

COMPUTE A MORPHOLOGICAL FILTER AND
APPLY IT TO THE DIGITAL IMAGE ~703

↓

COMPUTE AN EDGE FILTER AND
APPLY IT TO THE DIGITAL IMAGE ~705

↓

FILTER THE DIGITAL IMAGE USING THE MORPHOLOGICAL FILTER
AND/OR THE EDGE FILTER, WHERE FILTERING INCLUDES
ENHANCING THE SHARPNESS OF THE DIGITAL IMAGE ~707

↓

OUTPUT THE FILTERED DIGITAL IMAGE ~709

MORPHOLOGICAL AND GEOMETRIC EDGE FILTERS FOR EDGE ENHANCEMENT IN DEPTH IMAGES

FIELD

Embodiments described herein generally relate to computers. More particularly, embodiments relate to three-dimensional (3D) depth imaging systems, and morphological and geometric filters for edge enhancement in depth images at computing devices.

BACKGROUND

It is well known that acquisition techniques used for the creation of digital images introduce noise and artifacts resulting from imperfection of the imaging process. It is therefore common to use noise-reducing filters in attempt to improve the quality of the resulting image. Since the human eye is particularly sensitive to discontinuities (edges) in the image, one typically tries to reduce the noise while keeping the edges as unaltered as possible.

In particular, in the domain of 3D image acquisition, a depth image represents the distance of an object from the camera, and edges correspond to depth discontinuities (e.g., delimiting the boundaries of one object from another). Having sharp edges in a depth image is of paramount importance for numerous applications, such as texture mapping (where a color image captured by another camera is mapped onto the depth image) or object segmentation.

In coded light 3D acquisition systems, a scene is typically illuminated by a sequence of binary code patterns (such as vertical stripes), which are then captured by a camera. This way, each pixel seen by the camera has a code (allowing to infer the depth of the scene by triangulation from the known relative positions of the camera and the projector), as well as confidence (allowing to consider the depth estimation in a pixel as reliable or not). At depth discontinuities (such as edges), the code estimation is inaccurate, resulting in noisy edges.

Furthermore, poorly illuminated parts of the scene (e.g. very distant background objects or objects with small reflection coefficients) would typically also have low confidence in depth estimation. After applying a threshold on the confidence level, such regions would typically appear as mostly non-confident with randomly located groups of confident pixels, looking at a temporal sequence of such depth images would contain a very disturbing temporal noise that should ideally be eliminated. Pixels along edges are typically poorly illuminated and appear in a similar manner as randomly confident/non-confident. Conversely, the surface of close objects with high reflection coefficients would typically contain mostly confident pixels, with the exception of a few spots of strong specular reflections that would be marked as non-confident.

It is desirable to improve depth images, such as those captured by coded light systems, and in particular, improvement of edges in such images.

BRIEF DESCRIPTION OF THE DRAWINGS

Embodiments are illustrated by way of example, and not by way of limitation, in the figures of the accompanying drawings in which like reference numerals refer to similar elements.

FIG. 7 illustrates a method for computing and applying a morphological filter and an edge filter to a digital image according to one embodiment.

DETAILED DESCRIPTION

Figure 1:
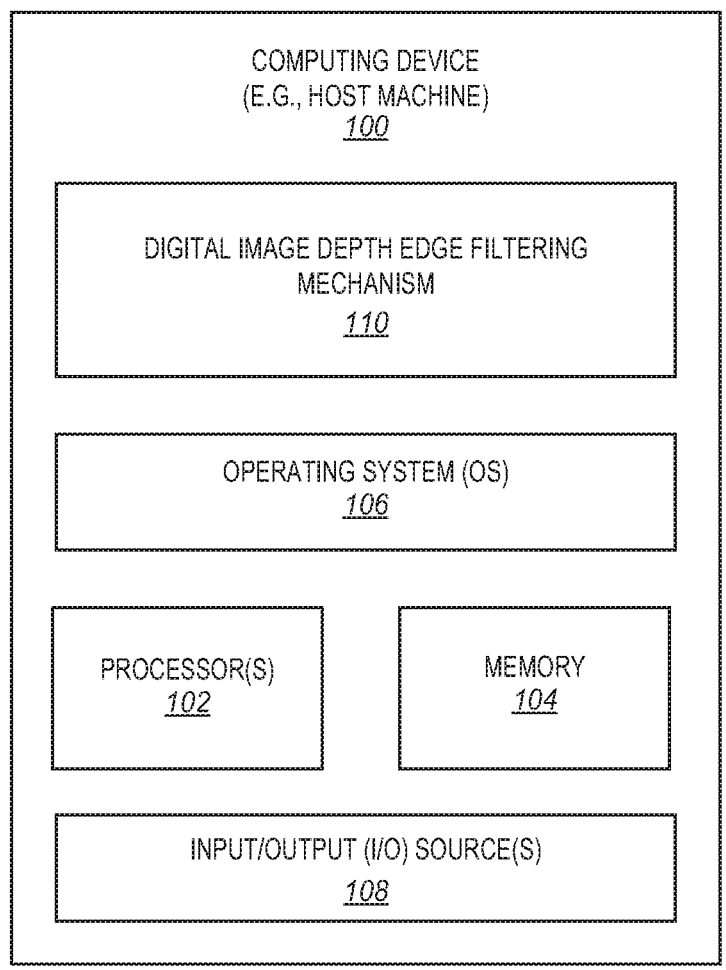
FIG. 1 illustrates a computing device employing a digital image depth edge filtering mechanism according to one embodiment.

In the following description, numerous specific details are set forth. However, embodiments, as described herein, may be practiced without these specific details. In other instances, well-known circuits, structures and techniques have not been shown in details in order not to obscure the understanding of this description.

Embodiments provide for a novel technique for allowing a combination of a morphological filter deciding for each pixel if it needed be treated as confident/non-confident considering the configuration of confident/non-confident pixels around it, and an edge-directed interpolation to estimate the value of the pixel from nearby pixels along the edge.

Embodiments provide for a superior edge sharpness compared to standard filters, while accounting for spatial configuration of confident/non-confident pixels. For example, needing a relatively small amount of operations per pixel may be easily realized in hardware, software, or firmware. In one embodiment, this combination of morphological and edge filter may be used on its own or in combination with other depth filters. A possible configuration may first apply the morphological filter that improves the structure of the edges in the image, then a depth filter such as bilateral filter, and then the geometric edge filter.

It is contemplated that "noise", throughout the document, interchangeably refers to "image noise" which is regarded as an undesirable by-product of image capture that is known for adding information or data that may be regarded as bogus, unauthenticated, illegitimate, unwanted, spurious, irrelevant, superfluous, and/or the like. The noise may be a form of electronic noise along with being a random variation of brightness or color information in digital images, where the noise may originate from any number and type of sources, such as film grain, etc., or be generated or caused by one or more input/out components of computing devices, such as one or more of digital depth-sensing cameras, sensors, detectors, scanners, etc. For example, noise refers to image noise that includes one or more of quantization noise, Gaussian noise, salt-and-pepper noise, short noise, anisotropic noise, and film grain.

In one embodiment, image receiving or capturing, depth measuring, etc., may be performed by one or more components of image capturing/depth sensing systems, such as depth sensors, depth-sensing cameras (e.g., Intel® RealSense™, etc.), ranging cameras, time-of-flight (ToF) cameras, etc.

It is contemplated and to be noted that embodiments are not limited to any particular number and type of software applications, application services, customized settings, etc., or any particular number and type of computing devices, networks, deployment details, etc.; however, for the sake of brevity, clarity, and ease of understanding, throughout this document, references are made to digital images, depth sensing, creating and executing filters, tracking, progressing, user interfaces, software applications, user preferences, customized settings, mobile computers (e.g., smartphones, tablet computers, etc.), communication medium/network (e.g., cloud network, the Internet, proximity network, Bluetooth, etc.), but that embodiments are not limited as such.

Figure 2:
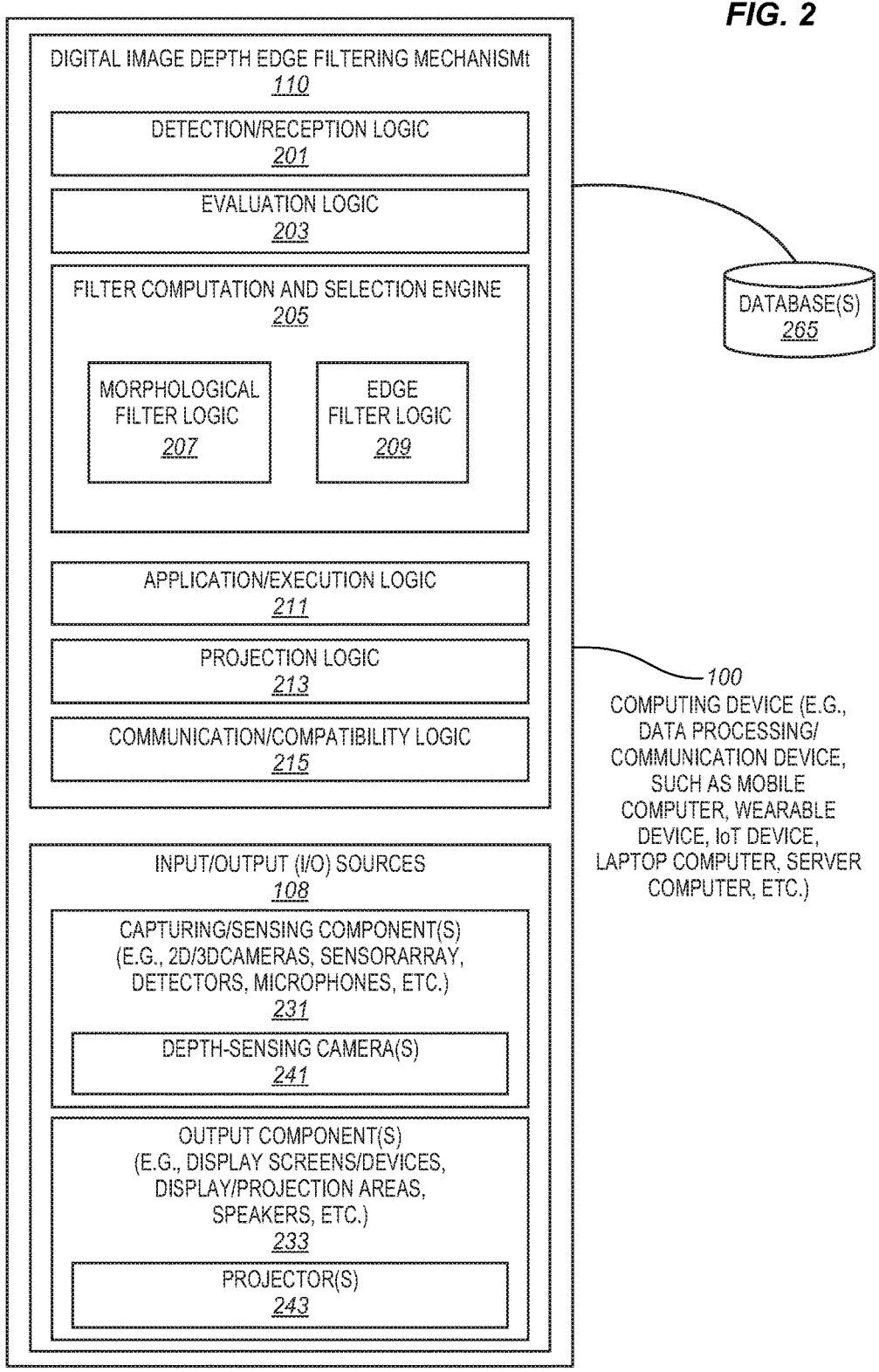
FIG. 2 illustrates a digital image depth edge filtering mechanism according to one embodiment.

FIG. 1 illustrates a computing device 100 employing a digital image depth edge filtering mechanism 110 according to one embodiment. Computing device 100 servers a host machine for hosting digital image depth edge filtering mechanism ("filtering mechanism") 110 that may include any number and type of components, as illustrated in FIG. 2, to facilitate intelligent and dynamic reduction in unwanted noise (e.g., undesirable information, etc.) in digital images that are captured or received using one or more of depth sensors, depth-sensing cameras (e.g., Intel® RealSense™, etc.), ranging cameras, time-of-flight (ToF) cameras, etc., to enhance user experience by offering clearer images, as will be further described throughout this document.

Computing device 100 may include any number and type of communication devices, such as large computing systems, such as server computers, desktop computers, etc., and may further include set-top boxes (e.g., Internet-based cable television set-top boxes, etc.), global positioning system (GPS)-based devices, etc. Computing device 100 may include mobile computing devices serving as communication devices, such as cellular phones including smartphones, personal digital assistants (PDAs), tablet computers, laptop computers (e.g., Ultrabook™ system, etc.), e-readers, media internet devices (MIDs), media players, smart televisions, television platforms, intelligent devices, computing dust, media players, smart windshields, smart windows, head-mounted displays (HMDs) (e.g., optical head-mounted display (e.g., wearable glasses, head-mounted binoculars, gaming displays, military headwear, etc.), and other wearable devices (e.g., smart watches, bracelets, smartcards, jewelry, clothing items, etc.), etc.

It is contemplated and to be noted that embodiments are not limited to computing device 100 and that embodiments may be applied to and used with any form or type glass that is used for viewing purposes, such as smart windshields, smart windows, and/or the like. Similarly, it is contemplated and to be noted that embodiments are not limited to any particular type of computing device and that embodiments may be applied and used with any number and type of computing devices; however, throughout this document, the focus of the discussion may remain on wearable devices, such as wearable glasses, etc., which are used as examples for brevity, clarity, and ease of understanding.

In some embodiments, computing device 100 may include a large(r) computing system (e.g., server computer, desktop computer, laptop computer, etc.), such that a flexible display screen may be part of this large(r) computing system where the flexible display screen may be a part or an extension screen of a main display screen, where the main screen itself may be flexible or static.

Computing device 100 may include an operating system (OS) 106 serving as an interface between hardware and/or physical resources of the computer device 100 and a user. Computing device 100 further includes one or more processors 102, memory devices 104, network devices, drivers, or the like, as well as input/output (I/O) sources 108, such as one or more touchable and/or non-touchable flexible display screen(s) (e.g., foldable screens, roll-able screens, bendable screens, curve-able screens, etc.), touchscreens, touch panels, touch pads, virtual or regular keyboards, virtual or regular mice, etc.

It is to be noted that terms like "node", "computing node", "server", "server device", "cloud computer", "cloud server", "cloud server computer", "machine", "host machine", "device", "computing device", "computer", "computing system", and the like, may be used interchangeably throughout this document. It is to be further noted that terms like "application", "software application", "program", "software program", "package", "software package", "code", "software code", and the like, may be used interchangeably throughout this document. Also, terms like "job", "input", "request", "message", and the like, may be used interchangeably throughout this document. It is contemplated that the term "user" may refer to an individual or a group of individuals using or having access to computing device 100.

FIG. 2 illustrates a digital image depth edge filtering mechanism 110 according to one embodiment. In one embodiment, filtering mechanism 110 may include any number and type of components, such as (without limitation): detection/reception logic 201; evaluation logic 203; filter computation and selection engine ("filter computation engine") 205 including morphological filter logic 207 and edge filter logic 209; application/execution logic 211; projection logic 213; and communication/compatibility logic 215.

Computing device 100 is further shown as hosting input/output source(s) 108 having capturing/sensing components 231 including depth camera(s) 241, sensors, detectors, microphones, etc., and output sources 233 including one or more projector(s) 243, display devices, speakers, etc.

In one embodiment, filtering mechanism 110 may be hosted by computing device 100, such as a communication/data-processing device including a mobile computer (e.g., smartphone, tablet computer, etc.), a wearable computers (e.g., wearable glasses, smart bracelets, smartcards, smart watches, HMDs, etc.), an Internet of Things (IoT) devices, and/or the like. In another embodiment, computing device 100 may be a larger communication machine, such as a server computer, a desktop computer, a laptop computer, etc. In one embodiment, computing device 100 may be in communication with one or more other computing devices (also referred to as "personal devices"), such as mobile computers, wearable devices, etc., over communication medium, such as one or more networks (e.g., cloud network, the Internet, proximity network, such as Bluetooth, etc.).

For example and in one embodiment, computing device 100 may serve as a server computer hosting filtering mechanism 110 in its entirety while communicating one or more services offered by filtering mechanism 110 with one or more other devices, such as client/personal devices, over communication medium, such as a cloud network. In another embodiment, computing device 100 itself may be another personal device having filtering mechanism 110, either partially or entirely, as part or in support of a software application, such as software application (also referred to as "application" or "client-based application") including a noise reduction (NR) application or a non-NR application or any other type of software application, such as a web browser, which may be downloadable or accessible over one more networks, such as a cloud network, a proximity network, the Internet.

I/O source(s) 108 include capturing/sensing component(s) 231 and output component(s) 233 which, as will be further described below, may also include any number and type of components, sensor arrays, detectors, displays, etc. For example, capturing/sensing components 231 may include (without limitation) depth-sensing camera(s) (e.g., Intel® RealSense™ camera, etc.), two-dimensional (2D) cameras, three-dimensional (3D) cameras, sensor arrays (such as context/context-aware sensors and environmental sensors, such as camera sensors, ambient light sensors, Red Green Blue (RGB) sensors, movement sensors, etc.), image sources, audio/video/signal detectors, microphones, eye/gaze-tracking systems, head-tracking systems, etc.), etc., while, output components 233 may include (without limitation) projector(s) 243, display/projection areas, audio/video/signal sources, display planes, display panels, display screens/devices, projectors, display/projection areas, speakers, etc.

Computing device 100 may be further in communication with one or more repositories or data sources or databases, such as database(s) 265, to obtain, communicate, store, and maintain any amount and type of data (e.g., convolution data, deconvolution data, transition stripes data, shaping data, pre-shaping data, captured digital images, projection data, recommendations, predictions, data tables, data maps, media, metadata, templates, real-time data, historical contents, user and/or device identification tags and other information, resources, policies, criteria, rules, regulations, upgrades, etc.).

Capturing/sensing components 231 may further include one or more of vibration components, tactile components, conductance elements, biometric sensors, chemical detectors, signal detectors, electroencephalography, functional near-infrared spectroscopy, wave detectors, force sensors (e.g., accelerometers), illuminators, eye-tracking or gaze-tracking system, head-tracking system, etc., that may be used for capturing any amount and type of visual data, such as images (e.g., photos, videos, movies, audio/video streams, etc.), and non-visual data, such as audio streams or signals (e.g., sound, noise, vibration, ultrasound, etc.), radio waves (e.g., wireless signals, such as wireless signals having data, metadata, signs, etc.), chemical changes or properties (e.g., humidity, body temperature, etc.), biometric readings (e.g., figure prints, etc.), brainwaves, brain circulation, environmental/weather conditions, maps, etc. It is contemplated that "sensor" and "detector" may be referenced interchangeably throughout this document. It is further contemplated that one or more capturing/sensing components 231 may further include one or more of supporting or supplemental devices for capturing and/or sensing of data, such as illuminators (e.g., infrared (IR) illuminator), light fixtures, generators, sound blockers, etc.

It is further contemplated that in one embodiment, capturing/sensing components 231 may further include any number and type of context sensors (e.g., linear accelerometer) for sensing or detecting any number and type of contexts (e.g., estimating horizon, linear acceleration, etc., relating to a mobile computing device, etc.). For example, capturing/sensing components 231 may include any number and type of sensors, such as (without limitations): accelerometers (e.g., linear accelerometer to measure linear acceleration, etc.); inertial devices (e.g., inertial accelerometers, inertial gyroscopes, micro-electro-mechanical systems (MEMS) gyroscopes, inertial navigators, etc.); gravity gradiometers to study and measure variations in gravitation acceleration due to gravity, etc.

Further, for example, capturing/sensing components 231 may include (without limitations): audio/visual devices (e.g., cameras, microphones, speakers, etc.); context-aware sensors (e.g., temperature sensors, facial expression and feature measurement sensors working with one or more cameras of audio/visual devices, environment sensors (such as to sense background colors, lights, etc.), biometric sensors (such as to detect fingerprints, etc.), calendar maintenance and reading device), etc.; global positioning system (GPS) sensors; resource requestor; and trusted execution environment (TEE) logic. TEE logic may be employed separately or be part of resource requestor and/or an I/O subsystem, etc. Capturing/sensing components 231 may further include voice recognition devices, photo recognition devices, facial and other body recognition components, voice-to-text conversion components, etc.

Similarly, output components 233 may include dynamic tactile touch screens having tactile effectors as an example of presenting visualization of touch, where an embodiment of such may be ultrasonic generators that can send signals in space which, when reaching, for example, human fingers can cause tactile sensation or like feeling on the fingers. Further, for example and in one embodiment, output components 233 may include (without limitation) one or more of light sources, display devices and/or screens, audio speakers, tactile components, conductance elements, bone conducting speakers, olfactory or smell visual and/or non/visual presentation devices, haptic or touch visual and/or non-visual presentation devices, animation display devices, biometric display devices, X-ray display devices, high-resolution displays, high-dynamic range displays, multi-view displays, and head-mounted displays (HMDs) for at least one of virtual reality (VR) and augmented reality (AR), etc.

In one embodiment, a projector, such as projector 243 (e.g., intelligent vision camera (IVCAM) projector), projects patterns of binary code (e.g., vertical stripes) that are reflected from an object and captured by a camera, such as camera 241. Similarly, projector 243 may also be responsible for projected any image noise that is not eliminated or reduced from its corresponding digital image. For example, when using camera 241 (e.g., Intel® RealSense™ coded-light 3D camera), a scene may be illuminated by a sequence of binary code patterns (e.g., vertical stripes, such as black and white stripes) that are captured by camera 241, where each pixel as seen by camera 241 may have a code allowing to infer the depth of the scene by, for example, triangulation from the known relative positions of camera 241 and projector 243.

In one embodiment, a digital image of an object may be captured by camera 241, where the image may then be detected by or received at detection/reception logic 201. It is contemplated that this image may include a number and type of distortions, such as image noises representing information/data that may regarded as unwanted, unessential, unnecessary, etc. In one embodiment, these image noises may be detected by detection/reception logic 201. Upon detection of noise in the captured image by detection/reception logic 201, evaluation logic 203 may be triggered to evaluate the noise and any other relevant data to determine whether the noise needs to be smoothed out and what type of filter is to be selected to accomplish the task, such as morphological filter, edge filter, etc.

For example, two filters, such as morphological filter and edge filter, may be applied such that one filter is applied after another (such as morphological filter is applied while the edge filter follows) or in combination with other filters. In one embodiment, morphological filter logic 207 of filter computation engine 205 may facilitate the morphological filter to analyze the spatial structure of confidence pixels in the neighborhood and decide whether the current pixel is to be treated as being confident or not. For example, morphological filter logic 207 facilitates filling in of missing pixels and/or removing of spurious pixels along edges to contribute to edge sharpness, etc. Further, morphological filter logic 207 facilitates filling in of holes in the depth image while allowing for removing of spurious pixels in dark regions, contributing to a more temporarily stable image. In one embodiment, application/execution logic may then be used to execute the morphological filter to initiate the process and obtain its intended benefits.

Similarly, in one embodiment, edge filter logic 209 of filter computation engine 205 may be used to facilitate an edge-directed interpolation for filling in of pixels along edges. Further, in one embodiment, application/execution logic may then be used to execute the edge filter to initiate the process and obtain its intended benefits.

In one embodiment, once the noise has been eliminated or at least significantly removed from the image, such as better edge sharpness has been achieved through the two filters, the resulting image may be verified and projected by projector 243 and as facilitated by projection logic 213. For example, during use, projector 243 may be configured by projection logic 213 to project the digital image without or smoothed out noise, leaving a sharper and uncorrupted image.

Communication/compatibility logic 215 may be used to facilitate dynamic communication and compatibility between computing device 100, database(s) 265, communication medium, etc., and any number and type of other computing devices (such as wearable computing devices, mobile computing devices, desktop computers, server computing devices, etc.), processing devices (e.g., central processing unit (CPU), graphics processing unit (GPU), etc.), capturing/sensing components (e.g., non-visual data sensors/detectors, such as audio sensors, olfactory sensors, haptic sensors, signal sensors, vibration sensors, chemicals detectors, radio wave detectors, force sensors, weather/temperature sensors, body/biometric sensors, scanners, etc., and visual data sensors/detectors, such as cameras, etc.), user/context-awareness components and/or identification/verification sensors/devices (such as biometric sensors/detectors, scanners, etc.), memory or storage devices, data sources, and/or database(s) (such as data storage devices, hard drives, solid-state drives, hard disks, memory cards or devices, memory circuits, etc.), network(s) (e.g., Cloud network, the Internet, Internet of Things, intranet, cellular network, proximity networks, such as Bluetooth, Bluetooth low energy (BLE), Bluetooth Smart, Wi-Fi proximity, Radio Frequency Identification (RFID), Near Field Communication (NFC), Body Area Network (BAN), etc.), wireless or wired communications and relevant protocols (e.g., Wi-Fi®, WiMAX, Ethernet, etc.), connectivity and location management techniques, software applications/websites, (e.g., social and/or business networking websites, business applications, games and other entertainment applications, etc.), programming languages, etc., while ensuring compatibility with changing technologies, parameters, protocols, standards, etc.

Throughout this document, terms like "logic", "component", "module", "framework", "engine", "tool", and the like, may be referenced interchangeably and include, by way of example, software, hardware, and/or any combination of software and hardware, such as firmware. Further, any use of a particular brand, word, term, phrase, name, and/or acronym, such as "image", "digital image", "depth-sensing camera", "capture", "receive", "project", "projector", "object", "noise", "image noise", "filter", "morphological filter", "edge filter", "geometric filter", "edge", "edge sharpness", "sharpness", "noise reduction", "noise elimination", "noise management", "user", "user profile", "user preference", "user", "sender", "receiver", "personal device", "smart device", "mobile computer", "wearable device", etc., should not be read to limit embodiments to software or devices that carry that label in products or in literature external to this document.

It is contemplated that any number and type of components may be added to and/or removed from filter mechanism 110 to facilitate various embodiments including adding, removing, and/or enhancing certain features. For brevity, clarity, and ease of understanding of filter mechanism 110, many of the standard and/or known components, such as those of a computing device, are not shown or discussed here. It is contemplated that embodiments, as described herein, are not limited to any particular technology, topology, system, architecture, and/or standard and are dynamic enough to adopt and adapt to any future changes.

Figure 3:
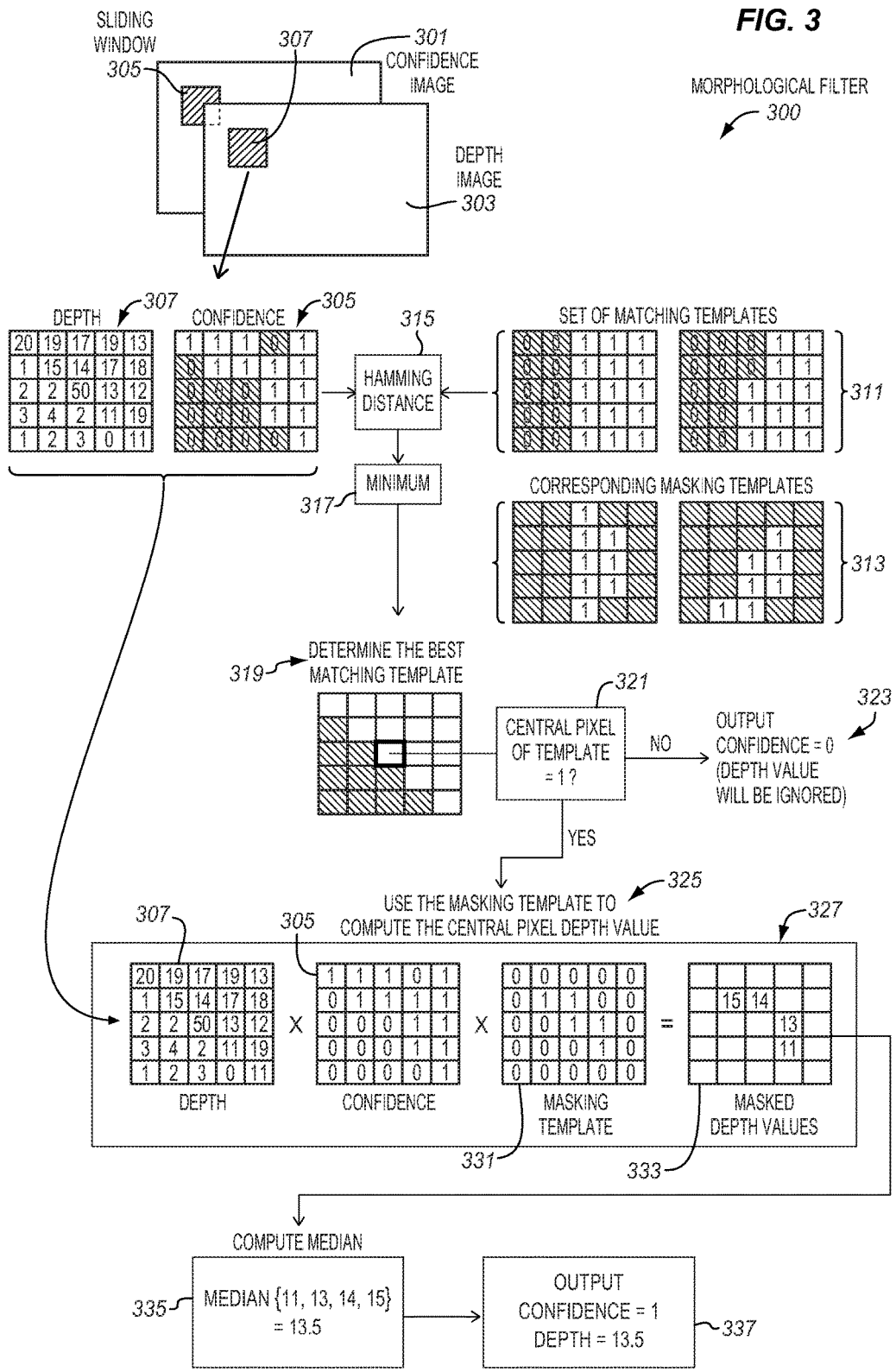
FIG. 3 illustrates a transaction sequence for computing and applying a morphological filter to a depth image according to one embodiment.

FIG. 3 illustrates a transaction sequence 300 for computing and applying a morphological filter with regard to digital image according to one embodiment. Transaction sequence 300 may be performed by processing logic that may comprise hardware (e.g., circuitry, dedicated logic, programmable logic, etc.), software (such as instructions run on a processing device), or a combination thereof, as facilitated by filter mechanism 110 of FIG. 1. The processes of transaction sequence 300 are illustrated in linear sequences for brevity and clarity in presentation; however, it is contemplated that any number of them can be performed in parallel, asynchronously, or in different orders. For brevity, many of the details discussed with reference to the previous figures may not be discussed or repeated hereafter.

In one embodiment, a morphological filter may operate on a depth image 303 where each pixel in addition to the depth value also has accompanying confidence information (e.g., confidence image 301). The confidence values can be binary (0=non-confident and 1=confident, as illustrated in FIG. 3) or contain continuous values expressing different levels of confidence (low=non-confident, high=confident). If the confidence image contains multiple level of confidence, it may be converted into a binary mask by setting to zero pixels below a configurable confidence threshold.

The morphological filter operates in a sliding window (patch) of pixels (such as 5×5 windows illustrated here), such as depth patch 307 and confidence path 305, in depth image 303 and confidence image 301, respectively. For each window location, the confidence values contained in the patch (such as confidence patch 305) are used to determine the geometric structure contained in the window. For this purpose, the confidence patch values are correlated to predefined templates 311 of different shapes. In the case when binary confidence values are used, the correlation is computed by performing pixel-wise XOR operation between the corresponding pixels in the binary confidence patch and the template, followed by summation in the window; the result is the Hamming distance 315 (number of different pixels) between the confidence patch and the template. Best matching template 319 is determined by taking minimum 317 over the Hamming distances of all the templates.

In other embodiments, the matching can be further conditioned by the Hamming distance being lower than some configurable threshold; if no template is matched with distance below the threshold, the patch is deemed unmatched and no action is taken.

Typical structures contained in pre-defined templates 311 are edges in different directions. For each template, the value of central pixel 312 is provided. This value is used to determine the output of the filter at the corresponding window location at process 321, which is done as follows: if the central pixel of best matching template 319 is 0, it means that the filter marks the pixel as a candidate for removal at 323, and such a pixel is marked as non-confident (independently of the actual confidence value 306 of the pixel), meaning its depth value will be ignored by subsequent processing stages.

However, if the central pixel of best matching template 319 is 1, such a pixel is assumed to be confident independently of whether actual confidence value 306 of the pixel is 1 or 0. Since, in the latter case, the depth value in the pixel might be noisy, new value 337 is computed from the nearby confident pixels, where, at process 325, the masking template is used to compute a central pixel depth value as further shown in processing block 327.

The neighborhood used for this computation is provided in the form of masking templates 313 associated with matching templates 311. The intersection of confidence patch values 305 and masking template 331 corresponding to best matching template 319 as determined during matching process 317 (computed as a pixel-wise AND operation between confidence patch 305 and masking template 331) determine masked depth pixels 333 used for new depth value 337 computation. In one embodiment, new depth value 337 is computed as median 335 over masked depth pixels 333.

In this example of FIG. 3, original confidence value 305 of the pixel is 0, however the best matching template central pixel is 1, meaning the filter will consider the pixel as valid and will try to "fill in" its depth value from four valid neighbor pixels which have depth values 11, 13, 14, 15 at masked depth values 333 at processing block 327. For example, computed median 335 equals 13.5, which is regarded as output 337 of the filter for that pixel.

Figure 4:
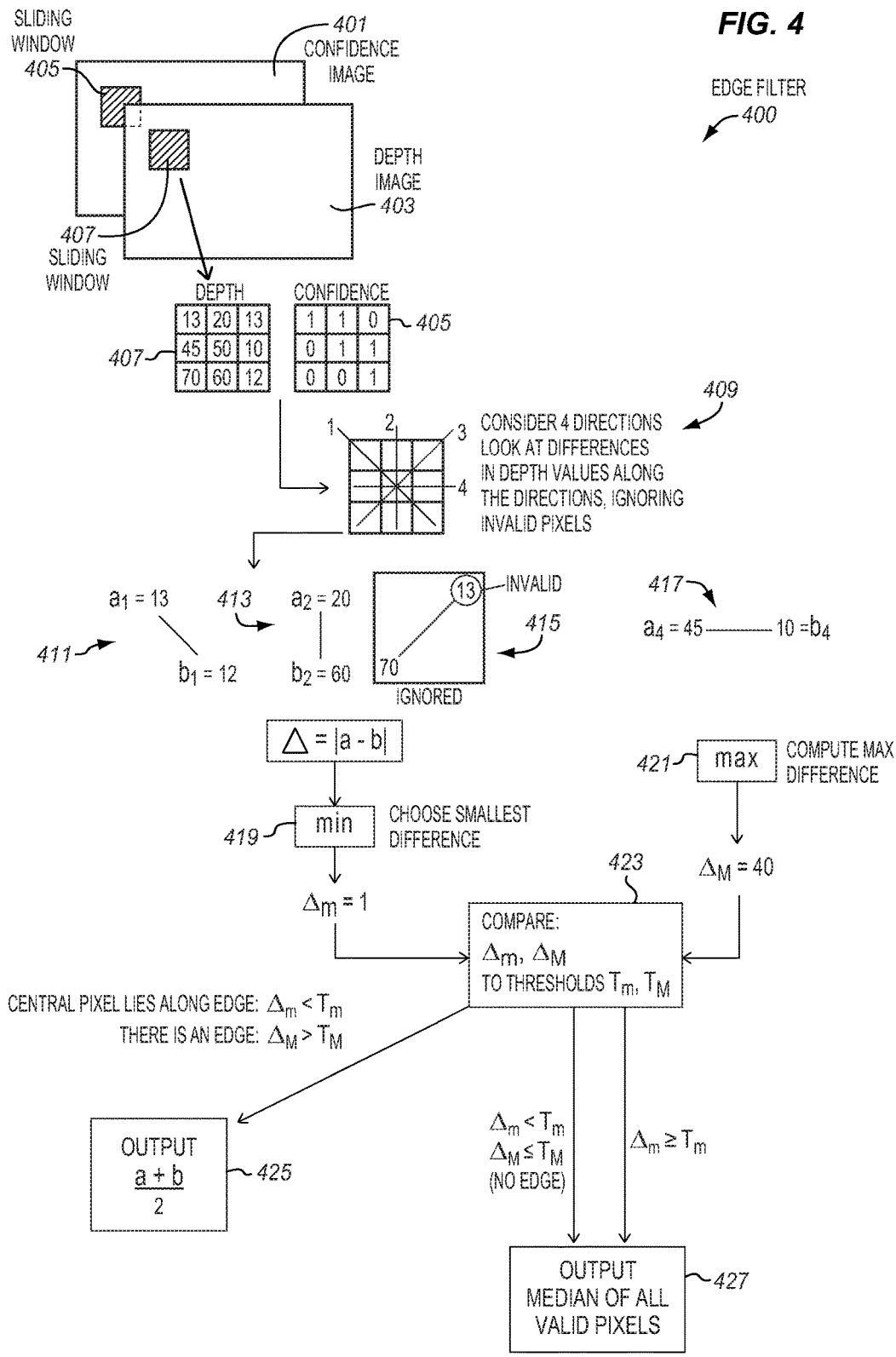
FIG. 4 illustrates a transaction sequence for computing and applying an edge filter to a depth image according to one embodiment.

Referring now to FIG. 4, it illustrates a transaction sequence 400 for computing and applying an edge filter with regard to digital image according to one embodiment. For brevity, many of the details discussed with reference to FIGS. 1-3 may not be discussed or repeated hereafter. Transaction sequence 400 may be performed by processing logic that may comprise hardware (e.g., circuitry, dedicated logic, programmable logic, etc.), software (such as instructions run on a processing device), or a combination thereof, as facilitated by filter mechanism 110 of FIG. 1. The processes of transaction sequence 400 are illustrated in linear sequences for brevity and clarity in presentation; however, it is contemplated that any number of them can be performed in parallel, asynchronously, or in different orders.

In one embodiment, an edge filter may be located inside a depth filter block, where, for example, the edge filter is a small averaging filter that is used for preserving edges of an image such that this edge-directed averaging allows for edge-preserving upscaling from half VGA (640×240) to VGA (640×480) resolution.

In one embodiment, the edge filter may operate on depth image 403 where each pixel in addition to the depth value also has accompanying confidence information (such as confidence image 401). The confidence values can be binary (0=non-confident and 1=confident, as illustrated in FIG. 4) or contain continuous values expressing different levels of confidence (low=non-confident, high=confident). If the confidence image contains multiple level of confidence, it may be converted into a binary mask by setting to zero pixels below a configurable confidence threshold.

The edge filter operates in a sliding window (patch) of pixels (for example, a 3×3 window as illustrated in FIG. 4), such as depth patch 407 and confidence patch 405 in depth image 403 and confidence image 401, respectively. For each window location, the absolute difference between the depth values along directions passing through the central pixel is computed; in one embodiment involving the window of size 3×3, four directions 409 are used and can be denoted as follows:

$$\begin{pmatrix} a_1 & a_2 & a_3 \\ b_4 & x & a_4 \\ b_3 & b_2 & b_1 \end{pmatrix}$$

where x denotes the center pixel and $a_1, \ldots, a_4$, $b_1, \ldots, b_4$ its 8 neighbors, such that pairs $(a_i, b_i)$ lie along said directions. Referring to the specific example in FIG. 4, the four directions comprise: the first diagonal 411 (values $a_1=13$, $b_1=12$), vertical 413 ($a_2=20$, $b_2=60$), second diagonal 415 ($a_3=13$, $b_3$, =70), and horizontal 417 ($a_4=45$, $b_4=10$), while the central pixel, x, lies in the middle of each of the four paths.

For pairs $(a_i, b_i)$ where both pixels $a_i$, $b_i$ are valid, the absolute difference $\Delta_i=|a_i-b_i|$ is computed. Referring to the specific example in FIG. 4, the four differences are $\Delta_1-|13-12|$, $\Delta_2-|20-60|$, $\Delta_3-|13-70|$, $\Delta_4-|45-10|$; the difference $\Delta_3$ is 01, ignored because one of the pixels ($a_3=13$) is invalid.

For example, minimum 419 and maximum 421 absolute difference values ($\Delta_m$ and $\Delta_M$, respectively) are then computed, where $\Delta_M$ is used as an edge indicator: if its value is large enough, then patch 407 contains an edge passing through the central pixel. For example, in a flat patch containing approximately equal depth values, $\Delta_M \sim 0$. On the other hand, $\Delta_m$ is used as a criterion of "edge roughness" (variation of depth values along the edge). For example, in a patch containing random depth values, $\Delta_m >> 0$, while in a patch containing a clean step passing through the central pixel, $\Delta_m \sim 0$.

In one embodiment, the output of the filter is triggered by comparison 423 of $\Delta_m$ and $\Delta_M$ to the corresponding thresholds $T_m$ and $T_M$, respectively. Distinction is made between the situation of a clear edge (high edginess $\Delta_M > T_M$ and low edge roughness $\Delta_m < T_m$) and non-clear edge (low edginess $\Delta_M <= T_M$, or high edge roughness $\Delta_m >= T_m$). In the case of a clear edge, new value 425 of the central pixel is computed as the average along the edge, (a+b)/2. In the case of a non-clear edge, new value 427 of the central pixel is computed as the median over all valid pixels in the window. In the example shown in FIG. 4, the output in the former case is (13+12)/2=12.5 and median (13, 20, 45, 50, 10, 70, 60, 12)=32.5.

In one embodiment, the edge filter may be used to upscale HVGA images into VGA, as a better alternative to line duplication or linear or bicubic interpolation typically used for image upscaling. In this setting, the output VGA image has its odd rows (row 1, 3, 5, etc.) copied from the HVGA image (rows 1, 2, 3, etc.) and the role of the filter is to fill in the even rows (2, 4, etc.) from one row above and one row below (thus, row 2 is filled in from rows 1 and 3, and so on). Effectively, the edge filter takes a different shape with there being no valid middle row and appearing as follows:

$$\begin{pmatrix} a_1 & a_2 & a_3 \\ - & x & - \\ b_3 & b_2 & b_1 \end{pmatrix}$$

Thus, instead of four directions passing through the central pixel x, there are only three (the fourth horizontal one does not exist in this setting).

Referring now to FIG. 7, it illustrates a method 700 for computing and applying a morphological filter and an edge filter to a digital image according to one embodiment. Method 700 may be performed by processing logic that may comprise hardware (e.g., circuitry, dedicated logic, programmable logic, etc.), software (such as instructions run on a processing device), or a combination thereof, as facilitated by filter mechanism 110 of FIG. 1. The processes of method 700 are illustrated in linear sequences for brevity and clarity in presentation; however, it is contemplated that any number of them can be performed in parallel, asynchronously, or in different orders. For brevity, many of the details discussed with reference to the previous figures may not be discussed or repeated hereafter.

Method 700 begins at block 701 with detection of a digital image, where the digital image is capture using one or more capturing/sensing components, such as one or more depth-sensing cameras (e.g., Intel® RealSense™ cameras, etc.). It is contemplated that the digital image includes an image of a 3D object, where the digital image may include contaminated pixels causing depth edge noise, such as lack of or reduced sharpness in the digital image. It is contemplated that other forms of image noise may include (without limitation) depth quantization noise, saw-tooth noise, Gaussian noise, Poisson noise, salt-and-pepper noise, short noise, anisotropic noise, film grain, and/or the like. At block 703, an edge filter is computed and then, it is applied to the digital image. At block 705, the digital image is filtered using a morphological filter and/or the edge file, where filtering includes enhancing the sharpness of the digital image. At block 707, the filtered digital image is outputted.

Figure 5:
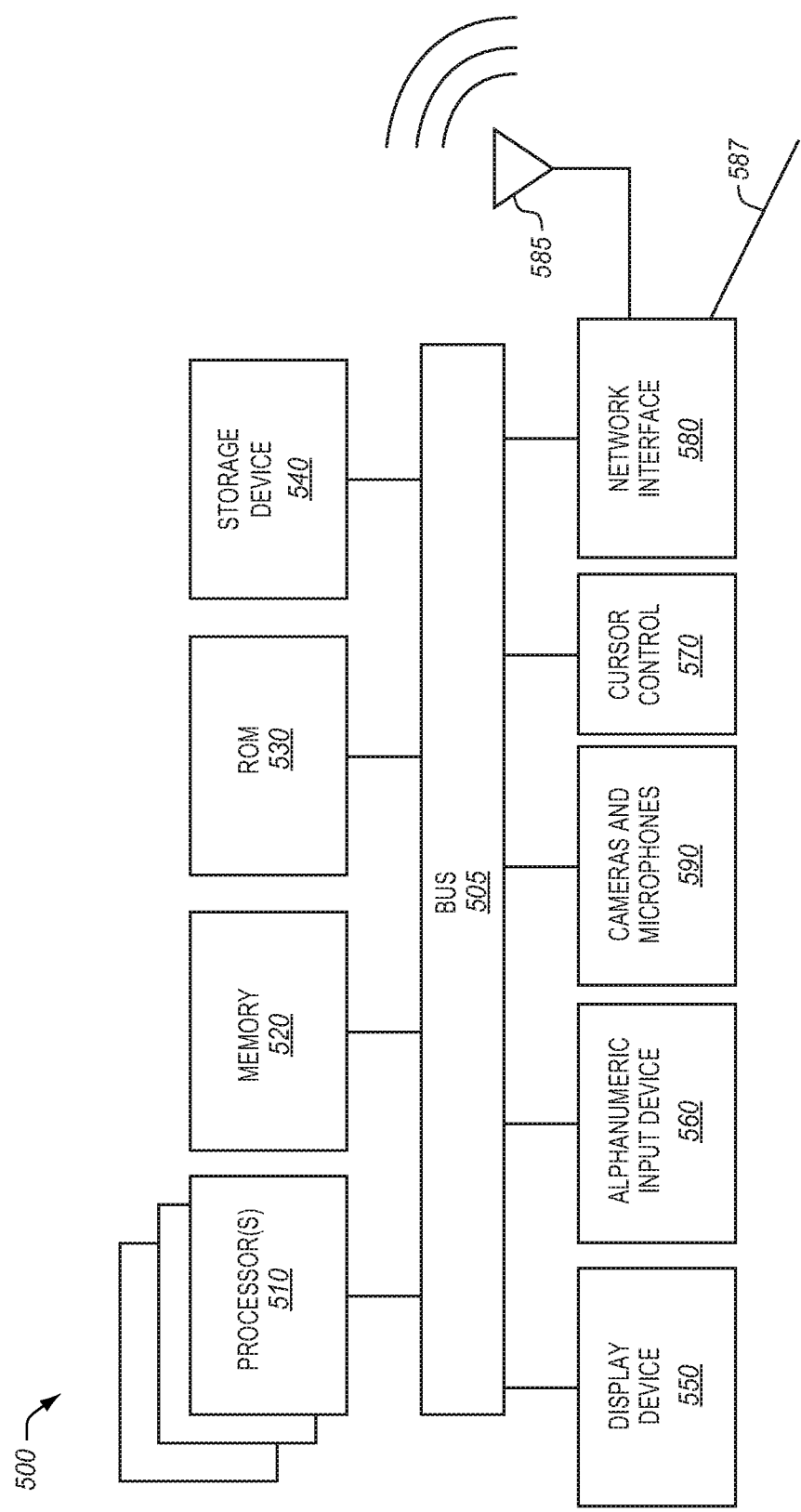
FIG. 5 illustrates computer system suitable for implementing embodiments of the present disclosure according to one embodiment.

FIG. 5 illustrates an embodiment of a computing system 500 capable of supporting the operations discussed above. Computing system 500 represents a range of computing and electronic devices (wired or wireless) including, for example, desktop computing systems, laptop computing systems, cellular telephones, personal digital assistants (PDAs) including cellular-enabled PDAs, set top boxes, smartphones, tablets, wearable devices, etc. Alternate computing systems may include more, fewer and/or different components. Computing device 500 may be the same as or similar to or include computing devices 100 described in reference to FIG. 1.

Computing system 500 includes bus 505 (or, for example, a link, an interconnect, or another type of communication device or interface to communicate information) and processor 510 coupled to bus 505 that may process information. While computing system 500 is illustrated with a single processor, it may include multiple processors and/or co-processors, such as one or more of central processors, image signal processors, graphics processors, and vision processors, etc. Computing system 500 may further include random access memory (RAM) or other dynamic storage device 520 (referred to as main memory), coupled to bus 505 and may store information and instructions that may be executed by processor 510. Main memory 520 may also be used to store temporary variables or other intermediate information during execution of instructions by processor 510.

Computing system 500 may also include read only memory (ROM) and/or other storage device 530 coupled to bus 505 that may store static information and instructions for processor 510. Data storage device 540 may be coupled to bus 505 to store information and instructions. Data storage device 540, such as magnetic disk or optical disc and corresponding drive may be coupled to computing system 500.

Computing system 500 may also be coupled via bus 505 to display device 550, such as a cathode ray tube (CRT), liquid crystal display (LCD) or Organic Light Emitting Diode (OLED) array, to display information to a user. User input device 560, including alphanumeric and other keys, may be coupled to bus 505 to communicate information and command selections to processor 510. Another type of user input device 560 is cursor control 570, such as a mouse, a trackball, a touchscreen, a touchpad, or cursor direction keys to communicate direction information and command selections to processor 510 and to control cursor movement on display 550. Camera and microphone arrays 590 of computer system 500 may be coupled to bus 505 to observe gestures, record audio and video and to receive and transmit visual and audio commands.

Computing system 500 may further include network interface(s) 580 to provide access to a network, such as a local area network (LAN), a wide area network (WAN), a metropolitan area network (MAN), a personal area network (PAN), Bluetooth, a cloud network, a mobile network (e.g., $3^{rd}$ Generation (3G), etc.), an intranet, the Internet, etc. Network interface(s) 580 may include, for example, a wireless network interface having antenna 585, which may represent one or more antenna(e). Network interface(s) 580 may also include, for example, a wired network interface to communicate with remote devices via network cable 587, which may be, for example, an Ethernet cable, a coaxial cable, a fiber optic cable, a serial cable, or a parallel cable.

Network interface(s) 580 may provide access to a LAN, for example, by conforming to IEEE 802.11b and/or IEEE 802.11g standards, and/or the wireless network interface may provide access to a personal area network, for example, by conforming to Bluetooth standards. Other wireless network interfaces and/or protocols, including previous and subsequent versions of the standards, may also be supported.

In addition to, or instead of, communication via the wireless LAN standards, network interface(s) 580 may provide wireless communication using, for example, Time Division, Multiple Access (TDMA) protocols, Global Systems for Mobile Communications (GSM) protocols, Code Division, Multiple Access (CDMA) protocols, and/or any other type of wireless communications protocols.

Network interface(s) 580 may include one or more communication interfaces, such as a modem, a network interface card, or other well-known interface devices, such as those used for coupling to the Ethernet, token ring, or other types of physical wired or wireless attachments for purposes of providing a communication link to support a LAN or a WAN, for example. In this manner, the computer system may also be coupled to a number of peripheral devices, clients, control surfaces, consoles, or servers via a conventional network infrastructure, including an Intranet or the Internet, for example.

It is to be appreciated that a lesser or more equipped system than the example described above may be preferred for certain implementations. Therefore, the configuration of computing system 500 may vary from implementation to implementation depending upon numerous factors, such as price constraints, performance requirements, technological improvements, or other circumstances. Examples of the electronic device or computer system 500 may include without limitation a mobile device, a personal digital assistant, a mobile computing device, a smartphone, a cellular telephone, a handset, a one-way pager, a two-way pager, a messaging device, a computer, a personal computer (PC), a desktop computer, a laptop computer, a notebook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, television, digital television, set top box, wireless access point, base station, subscriber station, mobile subscriber center, radio network controller, router, hub, gateway, bridge, switch, machine, or combinations thereof.

Embodiments may be implemented as any or a combination of: one or more microchips or integrated circuits interconnected using a parentboard, hardwired logic, software stored by a memory device and executed by a microprocessor, firmware, an application specific integrated circuit (ASIC), and/or a field programmable gate array (FPGA). The term "logic" may include, by way of example, software or hardware and/or combinations of software and hardware.

Embodiments may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments described herein. A machine-readable medium may include, but is not limited to, floppy diskettes, optical disks, CD-ROMs (Compact Disc-Read Only Memories), and magneto-optical disks, ROMs, RAMs, EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Moreover, embodiments may be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection).

References to "one embodiment", "an embodiment", "example embodiment", "various embodiments", etc., indicate that the embodiment(s) so described may include particular features, structures, or characteristics, but not every embodiment necessarily includes the particular features, structures, or characteristics. Further, some embodiments may have some, all, or none of the features described for other embodiments.

In the following description and claims, the term "coupled" along with its derivatives, may be used. "Coupled" is used to indicate that two or more elements co-operate or interact with each other, but they may or may not have intervening physical or electrical components between them.

As used in the claims, unless otherwise specified the use of the ordinal adjectives "first", "second", "third", etc., to describe a common element, merely indicate that different instances of like elements are being referred to, and are not intended to imply that the elements so described be in a given sequence, either temporally, spatially, in ranking, or in any other manner.

Figure 6:
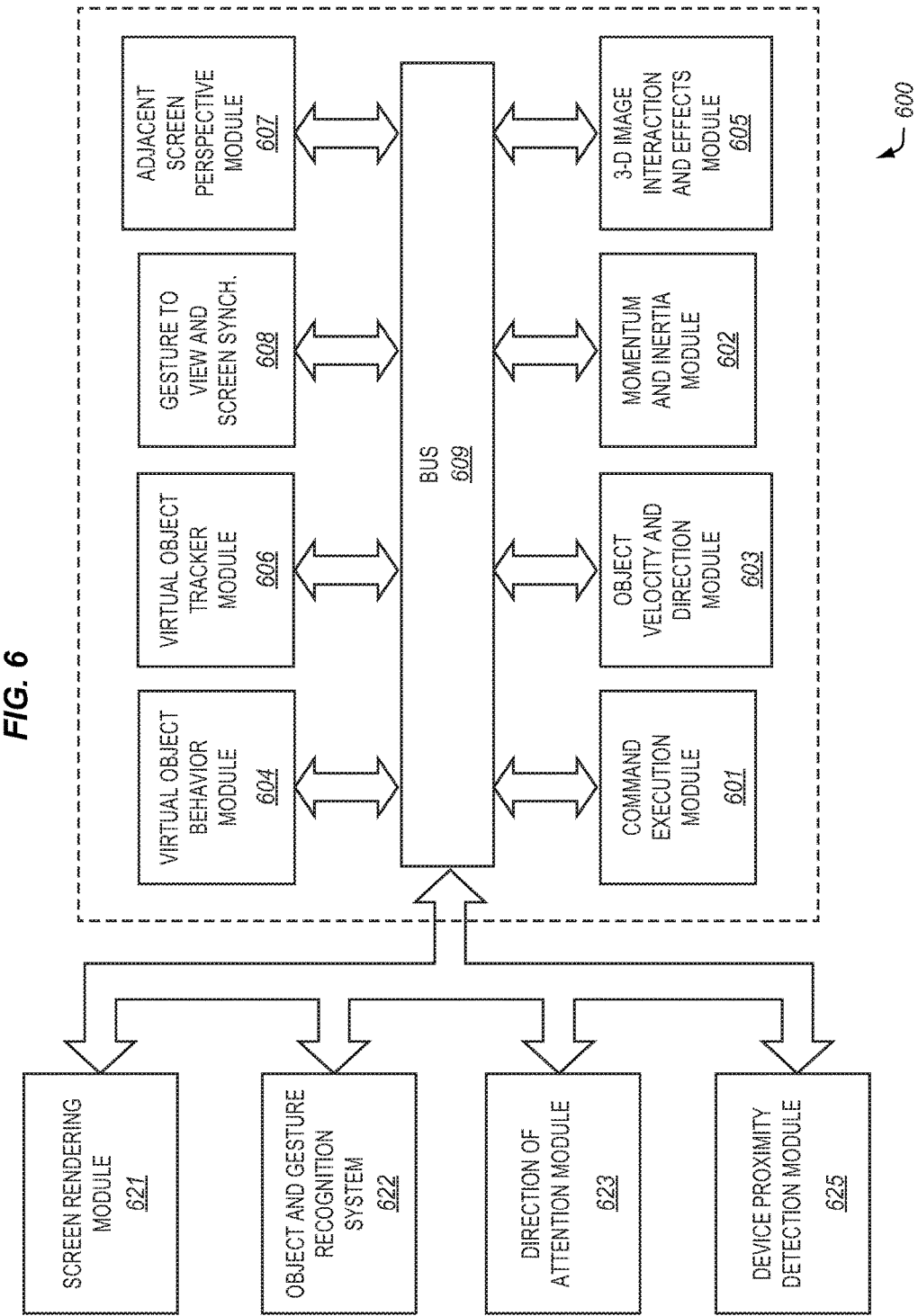
FIG. 6 illustrates computer environment suitable for implementing embodiments of the present disclosure according to one embodiment.

FIG. 6 illustrates an embodiment of a computing environment 600 capable of supporting the operations discussed above. The modules and systems can be implemented in a variety of different hardware architectures and form factors including that shown in FIG. 9.

The Command Execution Module 601 includes a central processing unit to cache and execute commands and to distribute tasks among the other modules and systems shown. It may include an instruction stack, a cache memory to store intermediate and final results, and mass memory to store applications and operating systems. The Command Execution Module may also serve as a central coordination and task allocation unit for the system.

The Screen Rendering Module 621 draws objects on the one or more multiple screens for the user to see. It can be adapted to receive the data from the Virtual Object Behavior Module 604, described below, and to render the virtual object and any other objects and forces on the appropriate screen or screens. Thus, the data from the Virtual Object Behavior Module would determine the position and dynamics of the virtual object and associated gestures, forces and objects, for example, and the Screen Rendering Module would depict the virtual object and associated objects and environment on a screen, accordingly. The Screen Rendering Module could further be adapted to receive data from the Adjacent Screen Perspective Module 607, described below, to either depict a target landing area for the virtual object if the virtual object could be moved to the display of the device with which the Adjacent Screen Perspective Module is associated. Thus, for example, if the virtual object is being moved from a main screen to an auxiliary screen, the Adjacent Screen Perspective Module 2 could send data to the Screen Rendering Module to suggest, for example in shadow form, one or more target landing areas for the virtual object on that track to a user's hand movements or eye movements.

The Object and Gesture Recognition System 622 may be adapted to recognize and track hand and harm gestures of a user. Such a module may be used to recognize hands, fingers, finger gestures, hand movements and a location of hands relative to displays. For example, the Object and Gesture Recognition Module could for example determine that a user made a body part gesture to drop or throw a virtual object onto one or the other of the multiple screens, or that the user made a body part gesture to move the virtual object to a bezel of one or the other of the multiple screens. The Object and Gesture Recognition System may be coupled to a camera or camera array, a microphone or microphone array, a touch screen or touch surface, or a pointing device, or some combination of these items, to detect gestures and commands from the user.

The touch screen or touch surface of the Object and Gesture Recognition System may include a touch screen sensor. Data from the sensor may be fed to hardware, software, firmware or a combination of the same to map the touch gesture of a user's hand on the screen or surface to a corresponding dynamic behavior of a virtual object. The sensor data may be used to momentum and inertia factors to allow a variety of momentum behavior for a virtual object based on input from the user's hand, such as a swipe rate of a user's finger relative to the screen. Pinching gestures may be interpreted as a command to lift a virtual object from the display screen, or to begin generating a virtual binding associated with the virtual object or to zoom in or out on a display. Similar commands may be generated by the Object and Gesture Recognition System, using one or more cameras, without the benefit of a touch surface.

The Direction of Attention Module 623 may be equipped with cameras or other sensors to track the position or orientation of a user's face or hands. When a gesture or voice command is issued, the system can determine the appropriate screen for the gesture. In one example, a camera is mounted near each display to detect whether the user is facing that display. If so, then the direction of attention module information is provided to the Object and Gesture Recognition Module 622 to ensure that the gestures or commands are associated with the appropriate library for the active display. Similarly, if the user is looking away from all of the screens, then commands can be ignored.

The Device Proximity Detection Module 625 can use proximity sensors, compasses, GPS (global positioning system) receivers, personal area network radios, and other types of sensors, together with triangulation and other techniques to determine the proximity of other devices. Once a nearby device is detected, it can be registered to the system and its type can be determined as an input device or a display device or both. For an input device, received data may then be applied to the Object Gesture and Recognition System 622. For a display device, it may be considered by the Adjacent Screen Perspective Module 607.

The Virtual Object Behavior Module 604 is adapted to receive input from the Object Velocity and Direction Module, and to apply such input to a virtual object being shown in the display. Thus, for example, the Object and Gesture Recognition System would interpret a user gesture and by mapping the captured movements of a user's hand to recognized movements, the Virtual Object Tracker Module would associate the virtual object's position and movements to the movements as recognized by Object and Gesture Recognition System, the Object and Velocity and Direction Module would capture the dynamics of the virtual object's movements, and the Virtual Object Behavior Module would receive the input from the Object and Velocity and Direction Module to generate data that would direct the movements of the virtual object to correspond to the input from the Object and Velocity and Direction Module.

The Virtual Object Tracker Module 606 on the other hand may be adapted to track where a virtual object should be located in three-dimensional space in a vicinity of an display, and which body part of the user is holding the virtual object, based on input from the Object and Gesture Recognition Module. The Virtual Object Tracker Module 606 may for example track a virtual object as it moves across and between screens and track which body part of the user is holding that virtual object. Tracking the body part that is holding the virtual object allows a continuous awareness of the body part's air movements, and thus an eventual awareness as to whether the virtual object has been released onto one or more screens.

The Gesture to View and Screen Synchronization Module 608, receives the selection of the view and screen or both from the Direction of Attention Module 623 and, in some cases, voice commands to determine which view is the active view and which screen is the active screen. It then causes the relevant gesture library to be loaded for the Object and Gesture Recognition System 622. Various views of an application on one or more screens can be associated with alternative gesture libraries or a set of gesture templates for a given view. As an example in FIG. 1A a pinch-release gesture launches a torpedo, but in FIG. 1B, the same gesture launches a depth charge.

The Adjacent Screen Perspective Module 607, which may include or be coupled to the Device Proximity Detection Module 625, may be adapted to determine an angle and position of one display relative to another display. A projected display includes, for example, an image projected onto a wall or screen. The ability to detect a proximity of a nearby screen and a corresponding angle or orientation of a display projected therefrom may for example be accomplished with either an infrared emitter and receiver, or electromagnetic or photo-detection sensing capability. For technologies that allow projected displays with touch input, the incoming video can be analyzed to determine the position of a projected display and to correct for the distortion caused by displaying at an angle. An accelerometer, magnetometer, compass, or camera can be used to determine the angle at which a device is being held while infrared emitters and cameras could allow the orientation of the screen device to be determined in relation to the sensors on an adjacent device. The Adjacent Screen Perspective Module 607 may, in this way, determine coordinates of an adjacent screen relative to its own screen coordinates. Thus, the Adjacent Screen Perspective Module may determine which devices are in proximity to each other, and further potential targets for moving one or more virtual object's across screens. The Adjacent Screen Perspective Module may further allow the position of the screens to be correlated to a model of three-dimensional space representing all of the existing objects and virtual objects.

The Object and Velocity and Direction Module 603 may be adapted to estimate the dynamics of a virtual object being moved, such as its trajectory, velocity (whether linear or angular), momentum (whether linear or angular), etc. by receiving input from the Virtual Object Tracker Module. The Object and Velocity and Direction Module may further be adapted to estimate dynamics of any physics forces, by for example estimating the acceleration, deflection, degree of stretching of a virtual binding, etc. and the dynamic behavior of a virtual object once released by a user's body part. The Object and Velocity and Direction Module may also use image motion, size and angle changes to estimate the velocity of objects, such as the velocity of hands and fingers The Momentum and Inertia Module 602 can use image motion, image size, and angle changes of objects in the image plane or in a three-dimensional space to estimate the velocity and direction of objects in the space or on a display. The Momentum and Inertia Module is coupled to the Object and Gesture Recognition System 622 to estimate the velocity of gestures performed by hands, fingers, and other body parts and then to apply those estimates to determine momentum and velocities to virtual objects that are to be affected by the gesture.

The 3D Image Interaction and Effects Module 605 tracks user interaction with 3D images that appear to extend out of one or more screens. The influence of objects in the z-axis (towards and away from the plane of the screen) can be calculated together with the relative influence of these objects upon each other. For example, an object thrown by a user gesture can be influenced by 3D objects in the foreground before the virtual object arrives at the plane of the screen. These objects may change the direction or velocity of the projectile or destroy it entirely. The object can be rendered by the 3D Image Interaction and Effects Module in the foreground on one or more of the displays. As illustrated, various components, such as components 601, 602, 603, 604, 605, 606, 607, and 608 are connected via an interconnect or a bus, such as bus 609.

The following clauses and/or examples pertain to further embodiments or examples. Specifics in the examples may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to performs acts of the method, or of an apparatus or system for facilitating hybrid communication according to embodiments and examples described herein.

Some embodiments pertain to Example 1 that includes an apparatus to facilitate increased user experience and efficient power performance using intelligent segmentation on flexible display screens, comprising: detection/reception logic to detect an input digital image of an object, the digital image comprising data pixels contaminated by noise and confidence pixels corresponding to the data pixels; morphological filter logic of filter computation engine to compute a morphological filter by matching the confidence pixels in the input digital image with a set of matching templates, and using a set of masking templates to determine the data pixels and confidence pixels in the filtered image; edge filter logic of the filter computation engine to compute an edge filter by performing computation of distances between the data pixels along a plurality of directions to determine an edge direction, and determining the data pixels and and the confidence pixels in a filtered image based on the edge direction; and application/execution logic to apply at least one of the morphological filter and the edge filter to filter the digital image.

Example 2 includes the subject matter of Example 1, further comprising communication/compatibility logic to output the filtered digital image, wherein the output comprises the data pixels and the confidence pixels.

Example 3 includes the subject matter of Example 1, wherein the digital image is captured via one or more capturing/sensing components of an imaging system at the apparatus, wherein the one or more capturing/sensing components include a depth-sensing camera to capture the digital image of the object including a three-dimensional (3D) object, wherein the digital image is a depth image, wherein the noise further comprises at least one of depth quantization noise, saw-tooth noise, Gaussian noise, Poisson noise, salt-and-pepper noise, short noise, anisotropic noise, and film grain.

Example 4 includes the subject matter of Example 1, wherein the morphological and edge filters are applied by running a sliding window on the input digital image and computing a filter output for each position of the sliding window, wherein the sliding window represents a block of the data pixels and the confidence pixels extracted from the input digital image for each position, wherein the confidence pixels provide accuracy of an estimation of corresponding data pixels.

Example 5 includes the subject matter of Example 1 or 4, wherein computing the morphological filter comprises: measuring a distance between a window of the confidence pixels and the set of matching templates to determine a best matching template; determining an output confidence value corresponding to a window location based on a center pixel of a best matching template of the set of matching templates; and determining an output data value corresponding to the window location using a masking template corresponding to the best matching template applied to the data values in the window.

Example 6 includes the subject matter of Example 5, wherein the distance between the window of the confidence pixels and the matching template is a sum of absolute differences or a sum of squared differences between corresponding confidence pixel values in the window and the matching template.

Example 7 includes the subject matter of Example 6, wherein determining the output data value comprises computing an aggregate of the data pixel values in the window, weighted by the corresponding confidence pixel values in the window and the corresponding pixels values in the masking template, wherein the aggregate is one of a weighted arithmetic mean, a weighted harmonic mean, a weighted geometric mean, and a weighted median.

Example 8 includes the subject matter of Example 6 or 7, wherein the confidence pixel values and the masking template pixel values are binary, wherein the distance between the confidence pixels and the matching template is the Hamming distance, and computing the aggregate comprises computing an AND binary function of the corresponding confidence pixel values and the masking template pixel values, and outputting a median value of the data pixel values at positions where an output of the AND binary function is equal to 1.

Example 9 includes the subject matter of Example 8, wherein the plurality of directions corresponds to directions at a plurality of angles around the center pixel of the sliding window, wherein the plurality of angles comprise four angles of 0 degrees, 45 degrees, 90 degrees, and 135 degrees, wherein one or more of the directions having low confidence pixels are ignored at end points, wherein determining the edge direction comprises computing an absolute difference of the data pixels at an end point of each direction, computing a maximum absolute difference over the directions to determine a maximum absolute value direction, computing a minimum absolute difference over the directions to determine a minimum absolute value direction, comparing the maximum absolute difference to a maximum threshold value, or comparing the minimum absolute difference to a minimum threshold value, wherein computing the output data pixel for each sliding window position comprises computing a mean of the data pixel values at an end points of a minimum absolute value direction, if the minimum absolute difference is below the minimum threshold value, and if the maximum absolute difference is above the maximum threshold value, or computing the aggregate of the data pixels values weighted by the corresponding confidence pixel values, and wherein the aggregate is one of the weighted arithmetic mean, the weighted harmonic mean, the weighted geometric mean, and the weighted median.

Some embodiments pertain to Example 10 that includes a method for facilitating depth image dequantization at computing devices, comprising: detecting an input digital image of an object, the digital image comprising data pixels contaminated by noise and confidence pixels corresponding to the data pixels; computing a morphological filter by matching the confidence pixels in the input digital image with a set of matching templates, and using a set of masking templates to determine the data pixels and confidence pixels in the filtered image; computing an edge filter by performing computation of distances between the data pixels along a plurality of directions to determine an edge direction, and determining the data pixels and the confidence pixels in a filtered image based on the edge direction; and applying at least one of the morphological filter and the edge filter to filter the digital image.

Example 11 includes the subject matter of Example 10, further comprising outputting the filtered digital image, wherein the output comprises the data pixels and the confidence pixels.

Example 12 includes the subject matter of Example 10, wherein the digital image is captured via one or more capturing/sensing components of an imaging system at the apparatus, wherein the one or more capturing/sensing components include a depth-sensing camera to capture the digital image of the object including a three-dimensional (3D) object, wherein the digital image is a depth image, wherein the noise further comprises at least one of depth quantization noise, saw-tooth noise, Gaussian noise, Poisson noise, salt-and-pepper noise, short noise, anisotropic noise, and film grain.

Example 13 includes the subject matter of Example 10, wherein the morphological and edge filters are applied by running a sliding window on the input digital image and computing a filter output for each position of the sliding window, wherein the sliding window represents a block of the data pixels and the confidence pixels extracted from the input digital image for each position, wherein the confidence pixel values provide accuracy of an estimation of corresponding data pixels.

Example 14 includes the subject matter of Example 10 or 13, wherein computing the morphological filter comprises: measuring a distance between a window of the confidence pixels and the set of matching templates to determine a best matching template; determining an output confidence value corresponding to a window location based on a center pixel of a best matching template of the set of matching templates; and determining an output data value corresponding to the window location using a masking template corresponding to the best matching template applied to the data values in the window.

Example 15 includes the subject matter of Example 14, wherein the distance between the window of the confidence pixels and the matching template is a sum of absolute differences or a sum of squared differences between corresponding confidence pixel values in the window and the matching template.

Example 16 includes the subject matter of Example 15, wherein determining the output data value comprises computing an aggregate of the data pixel values in the window, weighted by the corresponding confidence pixel values in the window and the corresponding pixels values in the masking template, and wherein the aggregate is one of a weighted arithmetic mean, a weighted harmonic mean, a weighted geometric mean, and a weighted median.

Example 17 includes the subject matter of Example 15 or 16, wherein the confidence pixel values and the masking template pixel values are binary, wherein the distance between the confidence pixels and the matching template is the Hamming distance, and computing the aggregate comprises computing an AND binary function of the corresponding confidence pixel values and the masking template pixel values, and outputting a median value of the data pixel values at positions where an output of the AND binary function is equal to 1.

Example 18 includes the subject matter of Example 10, wherein the plurality of directions corresponds to directions at a plurality of angles around the center pixel of the sliding window, wherein the plurality of angles comprise four angles of 0 degrees, 45 degrees, 90 degrees, and 135 degrees, wherein one or more of the directions having low confidence pixels are ignored at end points, wherein determining the edge direction comprises computing an absolute difference of the data pixels at an end point of each direction, computing a maximum absolute difference over the directions to determine a maximum absolute value direction, computing a minimum absolute difference over the directions to determine a minimum absolute value direction, comparing the maximum absolute difference to a maximum threshold value, or comparing the minimum absolute difference to a minimum threshold value, wherein computing the output data pixel for each sliding window position comprises computing a mean of the data pixel values at an end points of a minimum absolute value direction, if the minimum absolute difference is below the minimum threshold value, and if the maximum absolute difference is above the maximum threshold value, or computing the aggregate of the data pixels values weighted by the corresponding confidence pixel values, and wherein the aggregate is one of the weighted arithmetic mean, the weighted harmonic mean, the weighted geometric mean, and the weighted median.

Some embodiments pertain to Example 19 includes a system comprising a storage device having instructions, and a processor to execute the instructions to facilitate a mechanism to perform one or more operations comprising: detecting an input digital image of an object, the digital image comprising data pixels contaminated by noise and confidence pixels corresponding to the data pixels; computing a morphological filter by matching the confidence pixels in the input digital image with a set of matching templates, and using a set of masking templates to determine the data pixels and confidence pixels in the filtered image; computing an edge filter by performing computation of distances between the data pixels along a plurality of directions to determine an edge direction, and determining the data pixels and the confidence pixels in a filtered image based on the edge direction; and applying at least one of the morphological filter and the edge filter to filter the digital image.

Example 20 includes the subject matter of Example 19, wherein the one or more operations further comprise outputting the filtered digital image, wherein the output comprises the data pixels and the confidence pixels.

Example 21 includes the subject matter of Example 19, wherein the digital image is captured via one or more capturing/sensing components of an imaging system at the apparatus, wherein the one or more capturing/sensing components include a depth-sensing camera to capture the digital image of the object including a three-dimensional (3D) object, wherein the digital image is a depth image, wherein the noise further comprises at least one of depth quantization noise, saw-tooth noise, Gaussian noise, Poisson noise, salt-and-pepper noise, short noise, anisotropic noise, and film grain.

Example 22 includes the subject matter of Example 19, wherein the morphological and edge filters are applied by running a sliding window on the input digital image and computing a filter output for each position of the sliding window, wherein the sliding window represents a block of the data pixels and the confidence pixels extracted from the input digital image for each position, wherein the confidence pixel values provide accuracy of an estimation of corresponding data pixels.

Example 23 includes the subject matter of Example 19 or 22, wherein computing the morphological filter comprises: measuring a distance between a window of the confidence pixels and the set of matching templates to determine a best matching template; determining an output confidence value corresponding to a window location based on a center pixel of a best matching template of the set of matching templates; and determining an output data value corresponding to the window location using a masking template corresponding to the best matching template applied to the data values in the window.

Example 24 includes the subject matter of Example 23, wherein the distance between the window of the confidence pixels and the matching template is a sum of absolute differences or a sum of squared differences between corresponding confidence pixel values in the window and the matching template.

Example 25 includes the subject matter of Example 24, wherein determining the output data value comprises computing an aggregate of the data pixel values in the window, weighted by the corresponding confidence pixel values in the window and the corresponding pixels values in the masking template, and wherein the aggregate is one of a weighted arithmetic mean, a weighted harmonic mean, a weighted geometric mean, and a weighted median.

Example 26 includes the subject matter of Example 24 or 25, wherein the confidence pixel values and the masking template pixel values are binary, wherein the distance between the confidence pixels and the matching template is the Hamming distance, and computing the aggregate comprises computing an AND binary function of the corresponding confidence pixel values and the masking template pixel values, and outputting a median value of the data pixel values at positions where an output of the AND binary function is equal to 1.

Example 27 includes the subject matter of Example 19, wherein the plurality of directions corresponds to directions at a plurality of angles around the center pixel of the sliding window, wherein the plurality of angles comprise four angles of 0 degrees, 45 degrees, 90 degrees, and 135 degrees, wherein one or more of the directions having low confidence pixels are ignored at end points, wherein determining the edge direction comprises computing an absolute difference of the data pixels at an end point of each direction, computing a maximum absolute difference over the directions to determine a maximum absolute value direction, computing a minimum absolute difference over the directions to determine a minimum absolute value direction, comparing the maximum absolute difference to a maximum threshold value, or comparing the minimum absolute difference to a minimum threshold value, wherein computing the output data pixel for each sliding window position comprises computing a mean of the data pixel values at an end points of a minimum absolute value direction, if the minimum absolute difference is below the minimum threshold value, and if the maximum absolute difference is above the maximum threshold value, or computing the aggregate of the data pixels values weighted by the corresponding confidence pixel values, and wherein the aggregate is one of the weighted arithmetic mean, the weighted harmonic mean, the weighted geometric mean, and the weighted median.

Some embodiments pertain to Example 28 includes an apparatus comprising: means for detecting an input digital image of an object, the digital image comprising data pixels contaminated by noise and confidence pixels corresponding to the data pixels; means for computing a morphological filter by matching the confidence pixels in the input digital image with a set of matching templates, and using a set of masking templates to determine the data pixels and confidence pixels in the filtered image; means for computing an edge filter by performing computation of distances between the data pixels along a plurality of directions to determine an edge direction, and determining the data pixels and the confidence pixels in a filtered image based on the edge direction; and means for applying at least one of the morphological filter and the edge filter to filter the digital image.

Example 29 includes the subject matter of Example 28, further comprising means for outputting the filtered digital image, wherein the output comprises the data pixels and the confidence pixels.

Example 30 includes the subject matter of Example 28, wherein the digital image is captured via one or more capturing/sensing components of an imaging system at the apparatus, wherein the one or more capturing/sensing components include a depth-sensing camera to capture the digital image of the object including a three-dimensional (3D) object, wherein the digital image is a depth image, wherein the noise further comprises at least one of depth quantization noise, saw-tooth noise, Gaussian noise, Poisson noise, salt-and-pepper noise, short noise, anisotropic noise, and film grain.

Example 31 includes the subject matter of Example 28, wherein the morphological and edge filters are applied by running a sliding window on the input digital image and computing a filter output for each position of the sliding window, wherein the sliding window represents a block of the data pixels and the confidence pixels extracted from the input digital image for each position, wherein the confidence pixel values provide accuracy of an estimation of corresponding data pixels.

Example 32 includes the subject matter of Example 28 or 31, wherein the means for computing the morphological filter comprises: means for measuring a distance between a window of the confidence pixels and the set of matching templates to determine a best matching template; means for determining an output confidence value corresponding to a window location based on a center pixel of a best matching template of the set of matching templates; and means for determining an output data value corresponding to the window location using a masking template corresponding to the best matching template applied to the data values in the window.

Example 33 includes the subject matter of Example 32, wherein the distance between the window of the confidence pixels and the matching template is a sum of absolute differences or a sum of squared differences between corresponding confidence pixel values in the window and the matching template.

Example 34 includes the subject matter of Example 33, wherein the means for determining the output data value comprises means for computing an aggregate of the data pixel values in the window, weighted by the corresponding confidence pixel values in the window and the corresponding pixels values in the masking template, and wherein the aggregate is one of a weighted arithmetic mean, a weighted harmonic mean, a weighted geometric mean, and a weighted median.

Example 35 includes the subject matter of Example 33 or 34, wherein the confidence pixel values and the masking template pixel values are binary, wherein the distance between the confidence pixels and the matching template is the Hamming distance, and means for computing the aggregate comprises computing an AND binary function of the corresponding confidence pixel values and the masking template pixel values, and means for outputting a median value of the data pixel values at positions where an output of the AND binary function is equal to 1.

Example 36 includes the subject matter of Example 28, wherein the plurality of directions corresponds to directions at a plurality of angles around the center pixel of the sliding window, wherein the plurality of angles comprise four angles of 0 degrees, 45 degrees, 90 degrees, and 135 degrees, wherein one or more of the directions having low confidence pixels are ignored at end points, wherein determining the edge direction comprises computing an absolute difference of the data pixels at an end point of each direction, computing a maximum absolute difference over the directions to determine a maximum absolute value direction, computing a minimum absolute difference over the directions to determine a minimum absolute value direction, comparing the maximum absolute difference to a maximum threshold value, or comparing the minimum absolute difference to a minimum threshold value, wherein computing the output data pixel for each sliding window position comprises computing a mean of the data pixel values at an end points of a minimum absolute value direction, if the minimum absolute difference is below the minimum threshold value, and if the maximum absolute difference is above the maximum threshold value, or computing the aggregate of the data pixels values weighted by the corresponding confidence pixel values, and wherein the aggregate is one of the weighted arithmetic mean, the weighted harmonic mean, the weighted geometric mean, and the weighted median Example 37 includes at least one non-transitory or tangible machine-readable medium comprising a plurality of instructions, when executed on a computing device, to implement or perform a method as claimed in any of claims or examples 10-18.

Example 38 includes at least one machine-readable medium comprising a plurality of instructions, when executed on a computing device, to implement or perform a method as claimed in any of claims or examples 10-18.

Example 39 includes a system comprising a mechanism to implement or perform a method as claimed in any of claims or examples 10-18.

Example 40 includes an apparatus comprising means for performing a method as claimed in any of claims or examples 10-18.

Example 41 includes a computing device arranged to implement or perform a method as claimed in any of claims or examples 10-18.

Example 42 includes a communications device arranged to implement or perform a method as claimed in any of claims or examples 10-18.

Example 43 includes at least one machine-readable medium comprising a plurality of instructions, when executed on a computing device, to implement or perform a method or realize an apparatus as claimed in any preceding claims.

Example 44 includes at least one non-transitory or tangible machine-readable medium comprising a plurality of instructions, when executed on a computing device, to implement or perform a method or realize an apparatus as claimed in any preceding claims.

Example 45 includes a system comprising a mechanism to implement or perform a method or realize an apparatus as claimed in any preceding claims.

Example 46 includes an apparatus comprising means to perform a method as claimed in any preceding claims.

Example 47 includes a computing device arranged to implement or perform a method or realize an apparatus as claimed in any preceding claims.

Example 48 includes a communications device arranged to implement or perform a method or realize an apparatus as claimed in any preceding claims.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

What is claimed is:

1. An apparatus comprising:
   detection/reception logic to detect an input digital image of an object, the digital image comprising data pixels contaminated by noise and confidence pixels corresponding to the data pixels;
   morphological filter logic of filter computation engine to compute a morphological filter by matching the confidence pixels in the input digital image with a set of matching templates,
   and using a set of masking templates to determine the data pixels and confidence pixels in the filtered image;
   edge filter logic of the filter computation engine to compute an edge filter by performing computation of distances between the data pixels along a plurality of directions to determine an edge direction, and determining the data pixels and the confidence pixels in a filtered image based on the edge direction; and
   application/execution logic to apply at least one of the morphological filter and the edge filter to filter the digital image,
   wherein the morphological and edge filters are applied by running a sliding window on the input digital image and computing a filter output for each position of the sliding window, wherein the sliding window represents a block of the data pixels and the confidence pixels extracted from the input digital image for each position, wherein the confidence pixel values provide accuracy of an estimation of corresponding data pixels,
   wherein computing the morphological filter comprises measuring a distance between a window of the confidence pixels and the set of matching templates to determine a best matching template, determining an output confidence value corresponding to a window location based on a center pixel of a best matching template of the set of matching templates, and determining an output data value corresponding to the window location using a masking template corresponding to the best matching template applied to the data values in the window,
   wherein the distance between the window of the confidence pixels and the matching template is a sum of absolute differences or a sum of squared differences between corresponding confidence pixel values in the window and the matching template, and
   wherein the confidence pixel values and the masking template pixel values are binary, the distance between the confidence pixels and the matching template is the Hamming distance, and computing the aggregate comprises computing an AND binary function of the corresponding confidence pixel values and the masking template pixel values, and outputting a median value of the data pixel values at positions where an output of the AND binary function is equal to 1.

2. The apparatus of claim 1, further comprising communication and/or compatibility logic
to output the filtered digital image, wherein the output comprises the data pixels and the confidence pixels.

3. The apparatus of claim 1, wherein the digital image is captured via one or more
sensing components of an imaging system at the apparatus, wherein the one or more sensing components include a depth-sensing camera to capture the digital image of the object including a three-dimensional (3D) object, wherein the digital image is a depth image, wherein the noise further comprises at least one of depth quantization noise, saw-tooth noise, Gaussian noise, Poisson noise, salt-and-pepper noise, short noise, anisotropic noise, and film grain.

4. The apparatus of claim 1, wherein determining the output data value comprises
computing an aggregate of the data pixel values in the window, weighted by the corresponding confidence pixel values in the window and the corresponding pixels values in the masking template, and
wherein the aggregate is one of a weighted arithmetic mean, a weighted harmonic mean, a weighted geometric mean, and a weighted median.

5. The apparatus of claim 1, wherein the plurality of directions corresponds to
directions at a plurality of angles around the center pixel of the sliding window,
wherein the plurality of angles comprise four angles of O degrees, 45 degrees, 90 degrees, and 135 degrees,
wherein one or more of the directions having low confidence pixels are ignored at end points,
wherein determining the edge direction comprises computing an absolute difference of the data pixels at an end point of each direction, computing a maximum absolute difference over the directions to determine a maximum absolute value direction, computing a minimum absolute difference over the directions to determine a minimum absolute value direction, comparing the maximum absolute difference to a maximum threshold value, or comparing the minimum absolute difference to a minimum threshold value,
wherein computing the output data pixel for each sliding window position comprises
computing a mean of the data pixel values at an end points of a minimum absolute value direction, if the minimum absolute difference is below the minimum threshold value, and if the maximum absolute difference is above the maximum threshold value, or computing the aggregate of the data pixels values weighted by the corresponding confidence pixel values, and
wherein the aggregate is one of the weighted arithmetic mean, the weighted harmonic mean, the weighted geometric mean, and the weighted median.

6. A method comprising:
detecting an input digital image of an object, the digital image comprising data pixels contaminated by noise and confidence pixels corresponding to the data pixels;
computing a morphological filter by matching the confidence pixels in the input digital image with a set of matching templates, and using a set of masking templates to determine the data pixels and confidence pixels in the filtered image;
computing an edge filter by performing computation of distances between the data pixels along a plurality of directions to determine an edge direction, and determining the data pixels and the confidence pixels in a filtered image based on the edge direction; and
applying at least one of the morphological filter and the edge filter to filter the digital image,
wherein the morphological and edge filters are applied by running a sliding window on the input digital image and computing a filter output for each position of the sliding window, wherein the sliding window represents a block of the data pixels and the confidence pixels extracted from the input digital image for each position, wherein the confidence pixel values provide accuracy of an estimation of corresponding data pixels,
wherein computing the morphological filter comprises measuring a distance between a window of the confidence pixels and the set of matching templates to determine a best matching template, determining an output confidence value corresponding to a window location based on a center pixel of a best matching template of the set of matching templates, and determining an output data value corresponding to the window location using a masking template corresponding to the best matching template applied to the data values in the window,
wherein the distance between the window of the confidence pixels and the matching template is a sum of absolute differences or a sum of squared differences between corresponding confidence pixel values in the window and the matching template, and
wherein the confidence pixel values and the masking template pixel values are binary, the distance between the confidence pixels and the matching template is the Hamming distance, and computing the aggregate comprises computing an AND binary function of the corresponding confidence pixel values and the masking template pixel values, and outputting a median value of the data pixel values at positions where an output of the AND binary function is equal to 1.

7. The method of claim 6, further comprising outputting the filtered digital image,
wherein the output comprises the data pixels and the confidence pixels.

8. The method of claim 6, wherein the digital image is captured via one or more
capturing/sensing components of an imaging system at the apparatus, wherein the one or more capturing/sensing components include a depth-sensing camera to capture the digital image of the object including a three-dimensional (3D) object, wherein the digital image is a depth image,
wherein the noise further comprises at least one of depth quantization noise, saw-tooth noise, Gaussian noise, Poisson noise, salt-and-pepper noise, short noise, anisotropic noise, and film grain.

9. The method of claim 6, wherein determining the output data value comprises
computing an aggregate of the data pixel values in the window, weighted by the corresponding confidence pixel values in the window and the corresponding pixels values in the masking template, and wherein the aggregate is one of a weighted arithmetic mean, a weighted harmonic mean, a weighted geometric mean, and a weighted median.

10. The method of claim 6, wherein the plurality of directions corresponds to
   directions at a plurality of angles around the center pixel of the sliding window, wherein the plurality of angles comprise four angles of O degrees, 45 degrees, 90 degrees, and 135 degrees,
   wherein one or more of the directions having low confidence pixels are ignored at end points,
   wherein determining the edge direction comprises computing an absolute difference of the data pixels at an end point of each direction, computing a maximum absolute difference over the directions to determine a maximum absolute value direction, computing a minimum absolute difference over the directions to determine a minimum absolute value direction, comparing the maximum absolute difference to a maximum threshold value, or comparing the minimum absolute difference to a minimum threshold value,
   wherein computing the output data pixel for each sliding window position comprises
   computing a mean of the data pixel values at an end points of a minimum absolute value direction, if the minimum absolute difference is below the minimum threshold value, and if the maximum absolute difference is above the maximum threshold value, or computing the aggregate of the data pixels values weighted by the corresponding confidence pixel values, and
   wherein the aggregate is one of the weighted arithmetic mean, the weighted harmonic mean, the weighted geometric mean, and the weighted median.

11. At least one non-transitory machine-readable medium comprising a plurality of instructions,
   executed on a computing device, to facilitate the computing device to perform operations comprising:
   detecting an input digital image of an object, the digital image comprising data pixels
   contaminated by noise and confidence pixels corresponding to the data pixels;
   computing a morphological filter by matching the confidence pixels in the input digital image with a set of matching templates, and using a set of masking templates to determine the data pixels and confidence pixels in the filtered image;
   computing an edge filter by performing computation of distances between the data pixels along a plurality of directions to determine an edge direction, and determining the data pixels and the confidence pixels in a filtered image based on the edge direction; and
   applying at least one of the morphological filter and the edge filter to filter the digital image,
   wherein the morphological and edge filters are applied by running a sliding window on the input digital image and computing a filter output for each position of the sliding window, wherein the sliding window represents a block of the data pixels and the confidence pixels extracted from the input digital image for each position, wherein the confidence pixel values provide accuracy of an estimation of corresponding data pixels,
   wherein computing the morphological filter comprises measuring a distance between a window of the confidence pixels and the set of matching templates to determine a best matching template, determining an output confidence value corresponding to a window location based on a center pixel of a best matching template of the set of matching templates, and determining an output data value corresponding to the window location using a masking template corresponding to the best matching template applied to the data values in the window,
   wherein the distance between the window of the confidence pixels and the matching template is a sum of absolute differences or a sum of squared differences between corresponding confidence pixel values in the window and the matching template, and
   wherein the confidence pixel values and the masking template pixel values are binary, the distance between the confidence pixels and the matching template is the Hamming distance, and computing the aggregate comprises computing an AND binary function of the corresponding confidence pixel values and the masking template pixel values, and outputting a median value of the data pixel values at positions where an output of the AND binary function is equal to 1.

12. The non-transitory machine-readable medium of claim 11, wherein the operations further
   comprise outputting the filtered digital image, wherein the output comprises the data pixels and the confidence pixels,
   wherein the digital image is captured via one or more capturing/sensing components of an imaging system at the apparatus, wherein the one or more capturing/sensing components include a depth-sensing camera to capture the digital image of the object including a three-dimensional (3D) object, wherein the digital image is a depth image, wherein the noise further comprises at least one of depth quantization noise, saw-tooth noise, Gaussian noise, Poisson noise, salt-and-pepper noise, short noise, anisotropic noise, and film grain,
   wherein the morphological and edge filters are applied by running a sliding window on the input digital image and computing a filter output for each position of the sliding window,
   wherein the sliding window represents a block of the data pixels and the confidence pixels extracted from the input digital image for each position, wherein the confidence pixel values provide accuracy of an estimation of corresponding data pixels.

13. The non-transitory machine-readable medium of claim 11, wherein determining the output data
   value comprises computing an aggregate of the data pixel values in the window, weighted by the corresponding confidence pixel values in the window and the corresponding pixels values in the masking template, and
   wherein the aggregate is one of a weighted arithmetic mean, a weighted harmonic mean, a weighted geometric mean, and a weighted median.

14. The non-transitory machine-readable medium of claim 11, wherein the plurality of directions
   corresponds to directions at a plurality of angles around the center pixel of the sliding window,
   wherein the plurality of angles comprise four angles of O degrees, 45 degrees, 90 degrees, and 135 degrees,
   wherein one or more of the directions having low confidence pixels are ignored at end points,
   wherein determining the edge direction comprises computing an absolute difference of the data pixels at an end point of each direction, computing a maximum absolute difference over the directions to determine a maximum absolute value direction, computing a minimum absolute difference over the directions to determine a minimum absolute value direction, comparing the maximum absolute difference to a maximum threshold value, or comparing the minimum absolute difference to a minimum threshold value, wherein computing the output data pixel for each sliding window position comprises computing a mean of the data pixel values at an end points of a minimum absolute value direction, if the minimum absolute difference is below the minimum threshold value, and if the maximum absolute difference is above the maximum threshold value, or computing the aggregate of the data pixels values weighted by the corresponding confidence pixel values, and wherein the aggregate is one of the weighted arithmetic mean, the weighted harmonic mean, the weighted geometric mean, and the weighted median.

* * * * *